United States Patent
Lesner et al.

(10) Patent No.: US 11,010,368 B1
(45) Date of Patent: May 18, 2021

(54) WRITING INCOMING ITEMS TO A DATABASE BASED ON LOCATION OF SIMILAR ITEMS IN A DATABASE

(71) Applicant: INTUIT INC., Mountain View, CA (US)

(72) Inventors: Christopher Lesner, Mountain View, CA (US); Alexander S. Ran, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 937 days.

(21) Appl. No.: 15/686,761

(22) Filed: Aug. 25, 2017

(51) Int. Cl.
*G06F 16/23* (2019.01)
*G06F 16/22* (2019.01)
*G06F 16/2457* (2019.01)

(52) U.S. Cl.
CPC ...... *G06F 16/2379* (2019.01); *G06F 16/2282* (2019.01); *G06F 16/24578* (2019.01)

(58) Field of Classification Search
CPC ............ G06F 16/2379; G06F 16/2282; G06F 16/24578
USPC ........................................................ 707/703
See application file for complete search history.

(56) References Cited

U.S. PATENT DOCUMENTS

| | | | | |
|---|---|---|---|---|
| 7,624,073 B1 * | 11/2009 | Robinson | ............... | G06Q 20/04 705/67 |
| 7,966,329 B1 * | 6/2011 | Rukonic | ............... | G06Q 40/02 707/737 |
| 8,170,932 B1 * | 5/2012 | Krakowiecki | ......... | G06Q 40/12 705/30 |
| 9,542,710 B1 * | 1/2017 | Izrailevsky | ............ | G06Q 40/12 |
| 9,773,282 B1 * | 9/2017 | Haffey | ................... | G06Q 40/12 |
| 2002/0007330 A1 * | 1/2002 | Kumar | ................ | G06F 16/9535 705/36 R |
| 2015/0331878 A1 * | 11/2015 | Joseph | ................... | G06Q 10/10 707/731 |
| 2016/0125317 A1 * | 5/2016 | Benjamin | .............. | G06Q 30/02 706/12 |
| 2016/0203501 A1 * | 7/2016 | Pydynowski | ...... | G06Q 30/0204 705/7.33 |
| 2016/0239918 A1 * | 8/2016 | Lambur | ................. | G06Q 50/01 |

* cited by examiner

*Primary Examiner* — Kimberly L Wilson
(74) *Attorney, Agent, or Firm* — Patterson & Sheridan, LLP

(57) ABSTRACT

Embodiments disclosed herein relate to a method of writing a transaction to a data store having one or more data tables. An application agent receives transaction data for a first transaction of a first type. Application agent attempts to write the first transaction of the first type to a data table in the data store, provided that a transaction of the first type has been committed to the data store. Application agent scans a plurality of additional data stores for previously committed transactions of the first type Application agent determines additional transactions of another type that are co-located in a data table. Application agent ranks the additional transactions of the other type. Application agent identifies a data table in the data store to which a top ranking additional transaction of the other type has been committed. Application agent writes the first transaction to identified data table in the data store.

17 Claims, 8 Drawing Sheets

WRITING INCOMING ITEMS TO A DATABASE BASED ON LOCATION OF SIMILAR ITEMS IN A DATABASE

BACKGROUND

Field

Embodiments of the present disclosure generally relate to database categorization, and more specifically to categorizing incoming items based on a location of similar items in the database.

Description of the Related Art

Financial software applications allow a user to view their aggregated transactions across a variety of financial institutions in one place on their personal devices. Along with aggregating the user's transactions across a variety of financial institutions, financial software applications also provide users with the ability to categorize these transactions into one or more accounts. For example, financial software applications may provide users with default accounts directed to utility expenses, travel expenses, grocery expenses, and the like. Additionally, financial software applications may also allow the user to further customize the accounts by selecting/deselecting which accounts to track.

These features of software applications allow incoming transactions to be automatically committed to data stores associated with a pre-defined account, thus removing the need for the user to manually commit transaction data to a specific account. Additionally, once transactions are committed to data stores associated with these accounts, a user can take advantage of additional features of the application, such as generating graphs or reports directed to the user's expenses.

The abilities of these software applications to commit transactions and use additional features of the applications may be limited, however, when a transaction with ambiguous information is received. For example, although transactions with more prominent merchants may be easily categorized and committed to the appropriate data store, transactions associated with smaller merchants or merchants sending incomplete or fragmented information along with the transaction data may result in the transaction being inaccurately committed to a data store (e.g., committed to a data store associated with a different account than that which the transaction should be associated with). Some financial software applications may merely group transactions with ambiguous information into a generic, "unorganized" account, leaving subsequent categorization (and reorganization between different data stores) to the user.

Thus, what is needed is an improved method of analyzing transactions with unknown entities or having ambiguous information (incomplete or fragmented information) so that these transactions can be committed to the account data store for which the transaction should be associated with greater accuracy and so that fewer transactions end up in a generic, "unorganized" account, leaving subsequent categorization (and reorganization between different data stores) to the user, in both real time and offline.

SUMMARY

One embodiment of the present disclosure includes a method for writing a transaction to a data store having one or more data tables. An application agent receives transaction data for a first transaction of a first type. In some embodiments, the first type may refer to a first merchant associated with the transaction data. Application agent attempts to write the first transaction of the first type to a data table in the data store, provided that a transaction of the first type has been committed to the data store. Upon determining that a transaction of the first type has not been committed to any data table in the data store, application agent scans a plurality of additional data stores for previously committed transactions of the first type. For each previously committed transaction of the first type that was identified, application agent determines additional transactions of another type that are co-located in a data table with the previously committed transactions of the first type. Application agent ranks the additional transactions of the other type. Responsive to the ranking of the additional transactions of the other type, application agent identifies a data table in the data store to which a top ranking additional transactions of the other type have been committed. Application agent writes the first transaction to the identified data table in the data store.

Another embodiment provides a computer-readable storage medium having instructions, which, when executed on a processor, performs an operation for writing a transaction to a data store having one or more data tables. The operation generally includes an application agent that receives transaction data for a first transaction of a first type. Application agent attempts to write the first transaction of the first type to a data table in the data store, provided that a transaction of the first type has been committed to the data store. Upon determining that a transaction of the first type has not been committed to any data table in the data store, application agent scans a plurality of additional data stores for previously committed transactions of the first type. For each previously committed transaction of the first type that was identified, application agent determines additional transactions of another type that are co-located in a data table with the previously committed transactions of the first type. Application agent ranks the additional transactions of the other type. Responsive to the ranking of the additional transactions of the other type, application agent identifies a data table in the data store to which top ranking additional transactions of the other type have been committed. Application agent writes the first transaction to the identified data table in the data store.

Still another embodiment of the present invention includes a processor and a memory storing a program, which, when executed on the processor, performs an operation for writing a transaction to a data store having one or more data tables. The operation generally includes an application agent that receives transaction data for a first transaction of a first type. Application agent attempts to write the first transaction of the first type to a data table in the data store, provided that a transaction of the first type has been committed to the data store. Upon determining that a transaction of the first type has not been committed to any data table in the data store, application agent scans a plurality of additional data stores for previously committed transactions of the first type. For each previously committed transaction of the first type that was identified, application agent determines additional transactions of another type that are co-located in a data table with the previously committed transactions of the first type. Application agent ranks the additional transactions of the other type. Responsive to the ranking of the additional transactions of the other type, application agent identifies a data table in the data store to which top ranking additional transactions of the other type have been committed. Application agent writes the first transaction to the identified data table in the data store.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Financial software applications allow a user to view their aggregated transactions across a variety of financial institutions in one place on their personal devices. Along with aggregating the user's transactions across a variety of financial institutions, financial software applications also provide users with the ability to categorize these transactions into one or more accounts. For example, financial software applications may provide users with default accounts directed to utility expenses, travel expenses, grocery expenses, and the like. Additionally, financial software applications may also allow the user to further customize the accounts by selecting/deselecting which accounts to track or defining new accounts unique to the user.

Techniques discussed below provide an improvement to traditional financial software applications. For example, techniques discussed below provide for ways to automatically commit incoming transactions to data stores associated with a pre-defined account or a user-defined account. To do this, techniques discussed below leverage existing transactions written to a data store to more accurately commit an incoming transaction to a respective data store.

Figure 1:
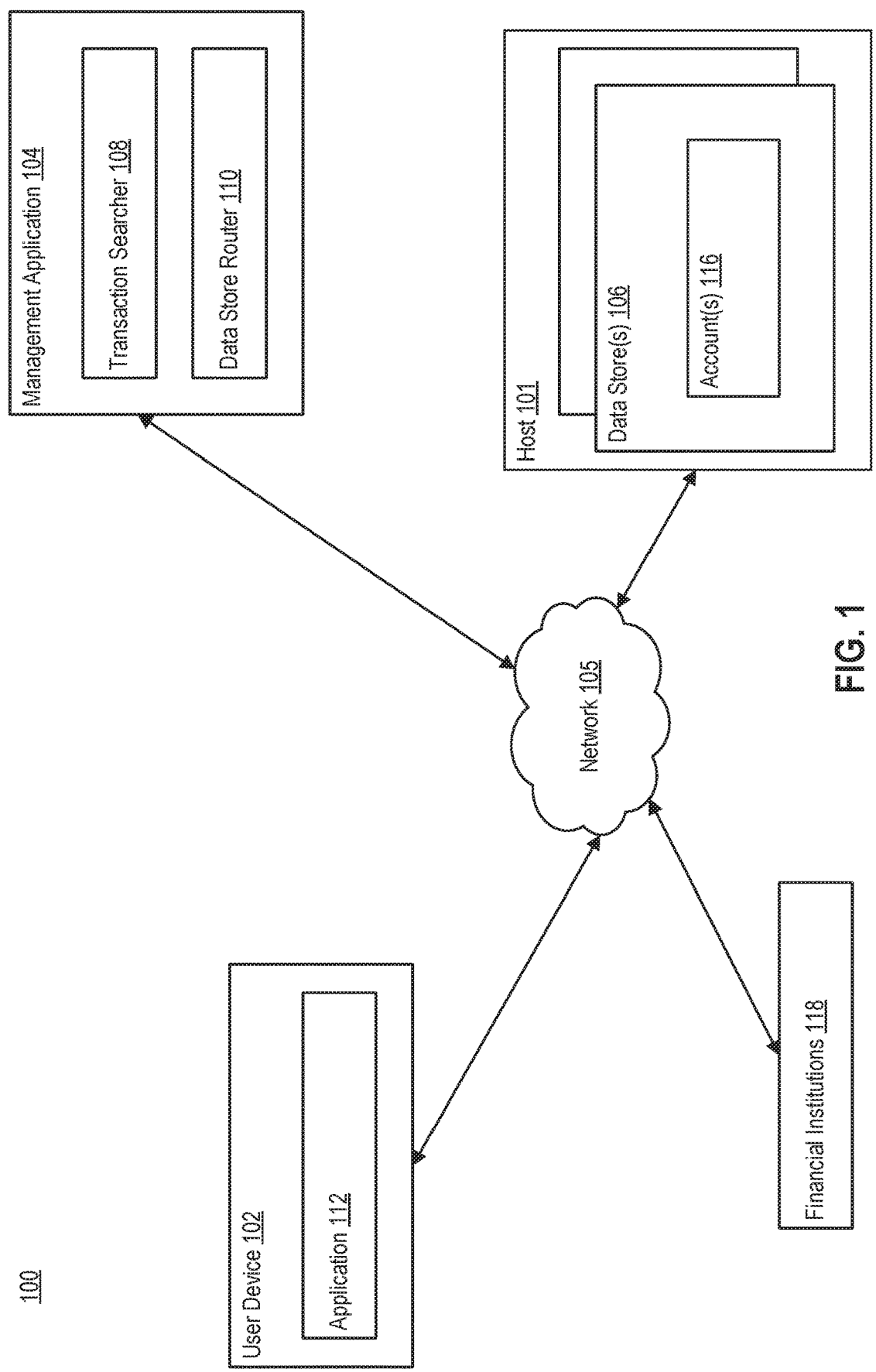
FIG. 1 illustrates an example networked computing environment, according to one embodiment.

FIG. 1 illustrates an example networked system 100, according to an embodiment. As illustrated, system 100 generally includes a user device 102, a management application 104, and one or more data stores 106 hosted on a host 101, each communicating over network 105.

User device 102 generally hosts an application 112. Application 112 may be a financial application, allowing a user to view and manage financial transactions across a plurality of accounts. Application 112 may be in communication with one or more financial accounts 116 of the user. For example, application 112 may be in communication with one or more financial institutions 118 hosting the user's checking account, savings account, credit account, and the like. In another example, application 112 may be in communication with one or more account management systems within a given company. For example, application 112 may be in communication with accounts for one or more divisions within a company, thus providing a user with a consolidated perspective of the accounts across the company. Application 112 is configured to aggregate all electronic financial transactions of the user, such that a user can view the aggregated financial data on user device 102. Each data store 106 corresponds to an account of one or more users. Each data store 106 includes one or more accounts 116. Each account may be directed to a specific category of transactions (e.g., operational expenses, capital expenses, and the like).

Committing transactions into a particular account 116 in a user's data store 106 allows the user to take advantage of one or more features of the application 112. For example, by committing transactions to a specific data table based on existing transactions in a database, a system can accelerate data commits into the database and improve the accuracy of dynamic data commit operations for sparse data sets. In some cases, users of application 112 may not need to manually enter transaction information into a financial database or move transaction information between different tables in a database or different databases. Additionally, once the transactions have been committed to a specific data table, the user can take advantage of one or more features of application 112 to generate graphs and/or reports about the user's financial activities. Moreover, information about categorized financial transactions can be leveraged by third parties (e.g., banks, financial institutions, etc.) that provide financial services, such as targeting of financial services to particular individuals based on the categorized financial transactions. Thus, categorized financial transactions lead to an improved user experience when using application 112, and may also provide valuable information for third parties.

There are some transactions, however, for which it is difficult for application 112 to commit to a proper account 116. For example, application 112 may receive a transaction that does not uniquely specify a pre-defined category associated with a respective account 116. Instead, the transaction comprises "ambiguous information," which may be in the form of a fragmented or abbreviated counterparty to a financial transaction that can fall into several predefined categories. The ambiguous information may lead to a degradation in the usefulness of categorizing transactions. Ambiguity may also arise when different users categorize transactions differently. For instance, user 1 may categorize transaction A in data store X associated with category M transactions, but user 2 may categorize transaction A in data store Y associated with category N transactions, based on the type of individual of user 1 and user 2. Using a specific example, a transaction in the form of "Food Store" may come in from a financial institution. User 1, being an individual, may categorize the Food Store transaction in the account "groceries;" but User 2, being a restaurant, may categorize the transaction in the account "inventory." As such, it is also important for application 112 to recognize that different individuals may categorize the same transaction from the same vendor in different accounts (and, accordingly, may commit transaction data for the same transaction to different tables in a data store).

Management application 104 is configured to aid in categorizing ambiguous transactions. Management application 104 includes transaction searcher 108 and data store router 110. Data store router 110 is configured to retrieve financial transactions from financial institutions 118. For example, in one embodiment, data store router 110 is configured to receive financial transactions transmitted from financial institution 118. In another embodiment, data store router 110 is configured to access one or more accounts of the user in each financial institution 118 to pull financial transaction information. Generally, financial transactions may be provided to management application 104 in real-time, as the financial institution 118 updates their own records. For example, when the financial institution 118 posts the transaction to their own specific online banking portal.

Transaction searcher 108 is configured to scan all the data stores 106 hosted on the host 101. For example, transaction searcher 108 is configured to leverage existing information related to how additional users categorize transactions from a given merchant, and apply that information to a specific user when an incoming ambiguous transaction is received. This stands in stark contrast to conventional approaches in which similarity measures were applied to cluster transactions across multiple data stores, such that a given user's data store history for a particular merchant could be used to make a transaction assignment prediction for a user receiving an ambiguous transaction. Clustering of data stores and cluster of transactions were both batch operations, however, which were to be carried out while the system 100 was offline. This is due to the fact that hundreds of millions of transactions need to be assigned to respective accounts in respective data stores, which can take a day or longer to compute. While the clustering of transactions is generally a batch operation that is executed offline, the subsequent categorization of incoming transactions and commitment of the categorized transactions to a data store, using the clustering information, may take place either offline or online. Although the subsequent categorization may be performed online (i.e., without having to take system 100 offline), a model for transaction categorization and commitment to an appropriate data store based on the clustering of transactions may need to be periodically updated. To update the model for categorization, system 100 is generally taken offline, updated, and placed online to perform subsequent transaction categorization and commitment to the appropriate data store using the updated model. Management application 104 aids in decreasing this assignment time, while allowing the system 100 to remain online, and assign transactions in real-time. In one embodiment, a model for categorization may be periodically updated. In another embodiment, the management application 194 switches to a new categorization model.

Figure 2:
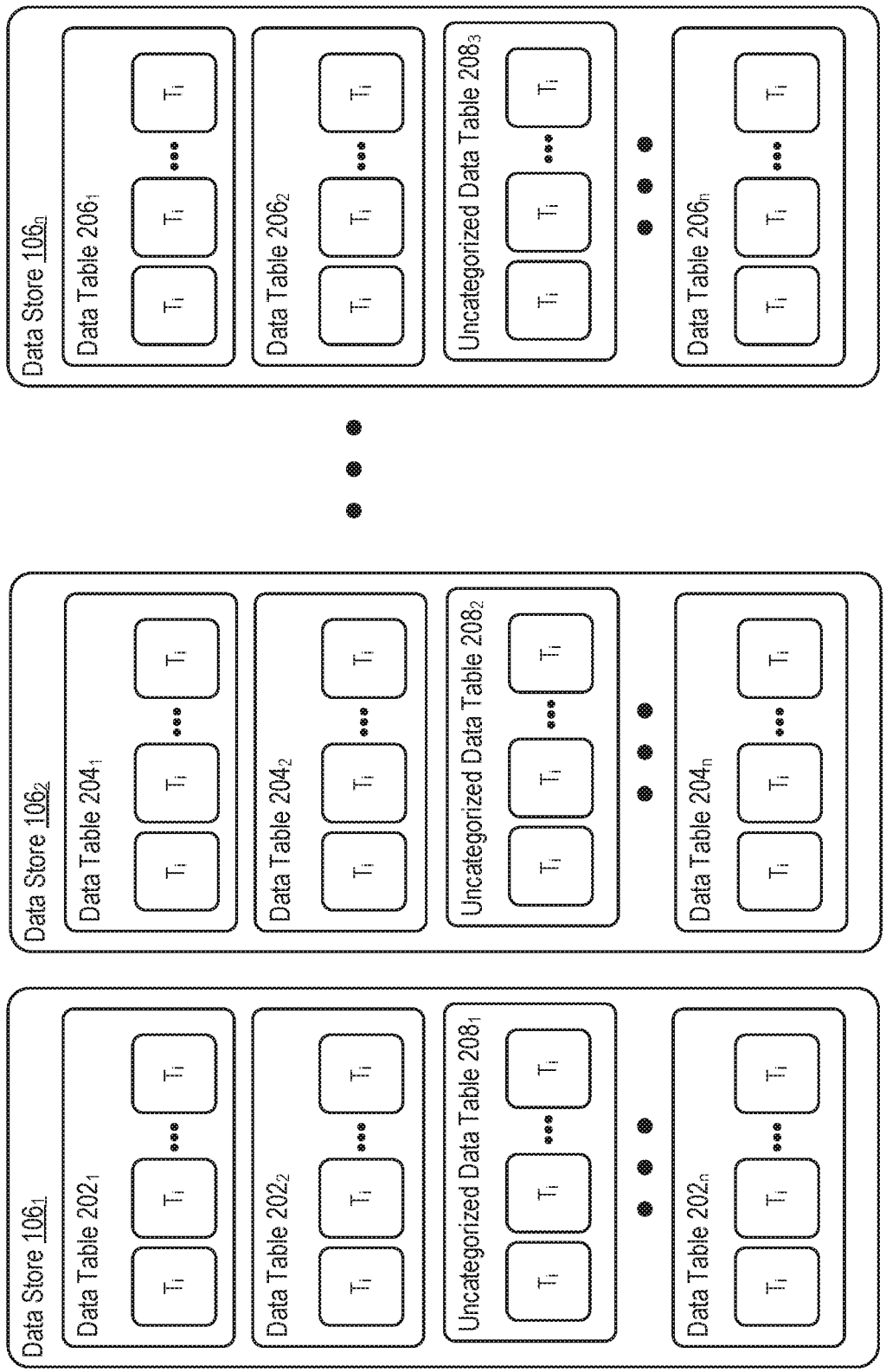
FIG. 2 illustrates an example of a plurality of data stores, according to one embodiment.

FIG. 2 illustrates an example of a plurality of data stores 106, according to one embodiment. Plurality of data stores 106 may generally include data store $106_1$, data store $106_2$, and data store $106_n$. Each data store 106 includes one or more data tables associated with one or more accounts. For example, a first data table may be directed to an operational expenses account. For example, data store $106_1$ may include data table $202_1$, data table $202_2$, and data table $202_n$; data store $106_2$ may include $204_1$, data table $204_2$, and data table $204_n$; and data store $106_n$ may include $206_1$, $206_2$, and $206_n$. Each data table $202_i$ in data store $106_1$ may be directed to a specific category of transactions. For example, data table $202_1$ may be directed to operational expenses; data table $202_2$ may be directed to utilities; and data table $202_n$ may be directed to an intellectual property expenses account. For example, data table $204_1$ may be directed to utilities, data table $204_2$ may be directed to home expenses, and data table $204_n$ may be directed to dining costs. For example, data table $206_1$ may be directed to technology expenses, data table $206_2$ may be directed to education expenses, and data table $206_n$ may be directed to food expenses. In addition to each pre-defined account, each data store $106_i$ may include an uncategorized data table $208_i$. For example, uncategorized data table $208_i$ is configured to store one or more transactions that comprise ambiguous information. In other words, uncategorized data table $208_i$ is configured to store those transactions for which application 112 cannot determine a categorized account. Specifically, data store $106_1$ includes uncategorized data table $208_1$, data store $106_2$ includes uncategorized data table $208_2$, and data store $106_n$ includes uncategorized data table $208_3$.

Figure 3:
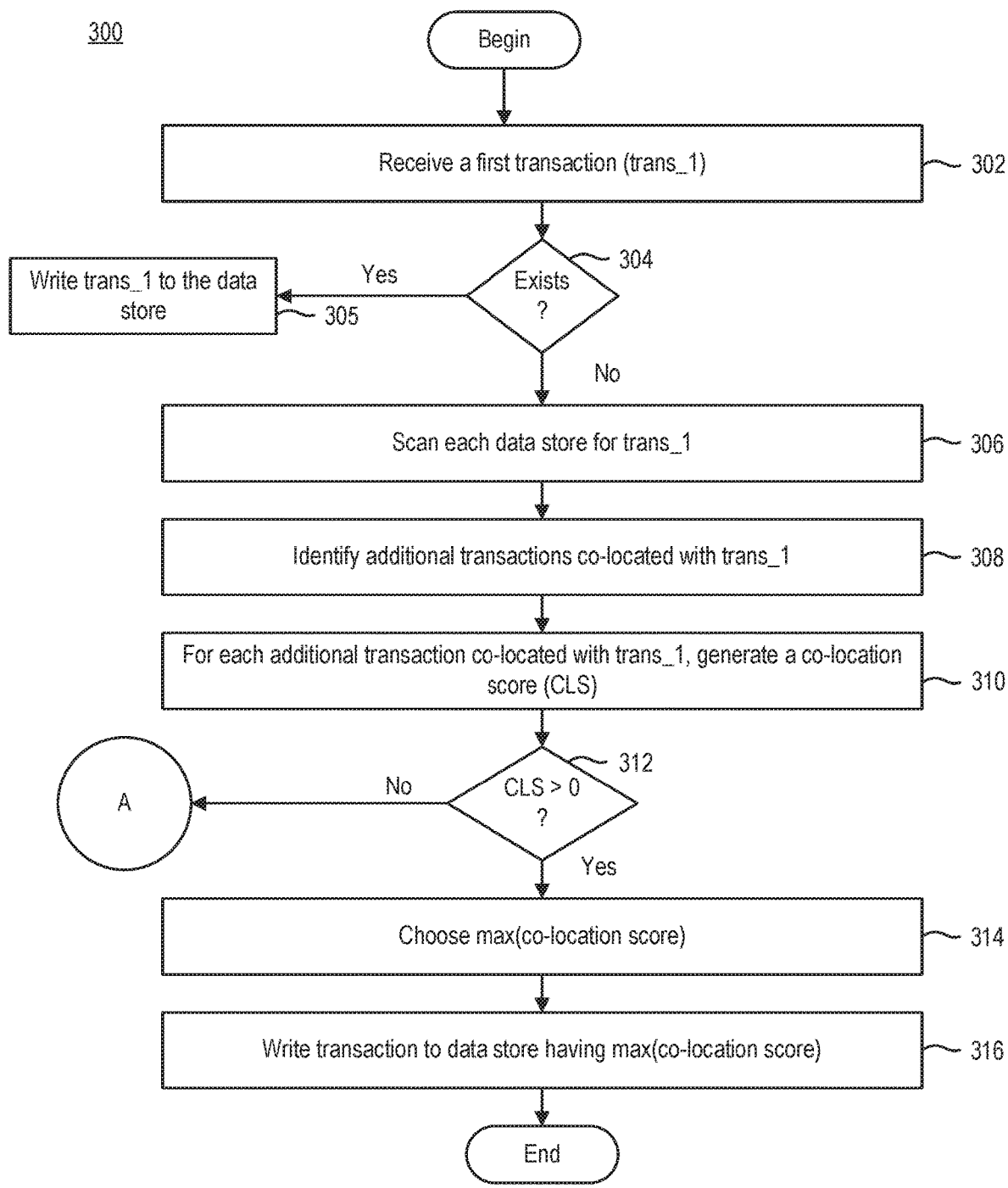
FIG. 3 is a flow diagram of a method for writing a transaction to a data store, according to one embodiment.

FIG. 3 is a flow diagram of a method 300 for writing a transaction to a data store, according to one embodiment. FIG. 3 is discussed in conjunction with FIGS. 4A-5C.

The method 300 begins at step 302. At step 302, management application 104 receives a first transaction from a first entity ($T_1$). Generically speaking, a transaction and its respective entity are represented as $T_i$, where i denotes the entity from which the transaction is from. Multiple $T_i$'s may not denote the same transaction multiple times, but rather, different transactions from the same entity, i. The first transaction comprises ambiguous data, for which management application 104 cannot automatically commit the first transaction in any data table of the user. For example, the first transaction may be a financial transaction at an independent corner store, which includes the ambiguous description "Corner Store."

Figures 4A, 4B:
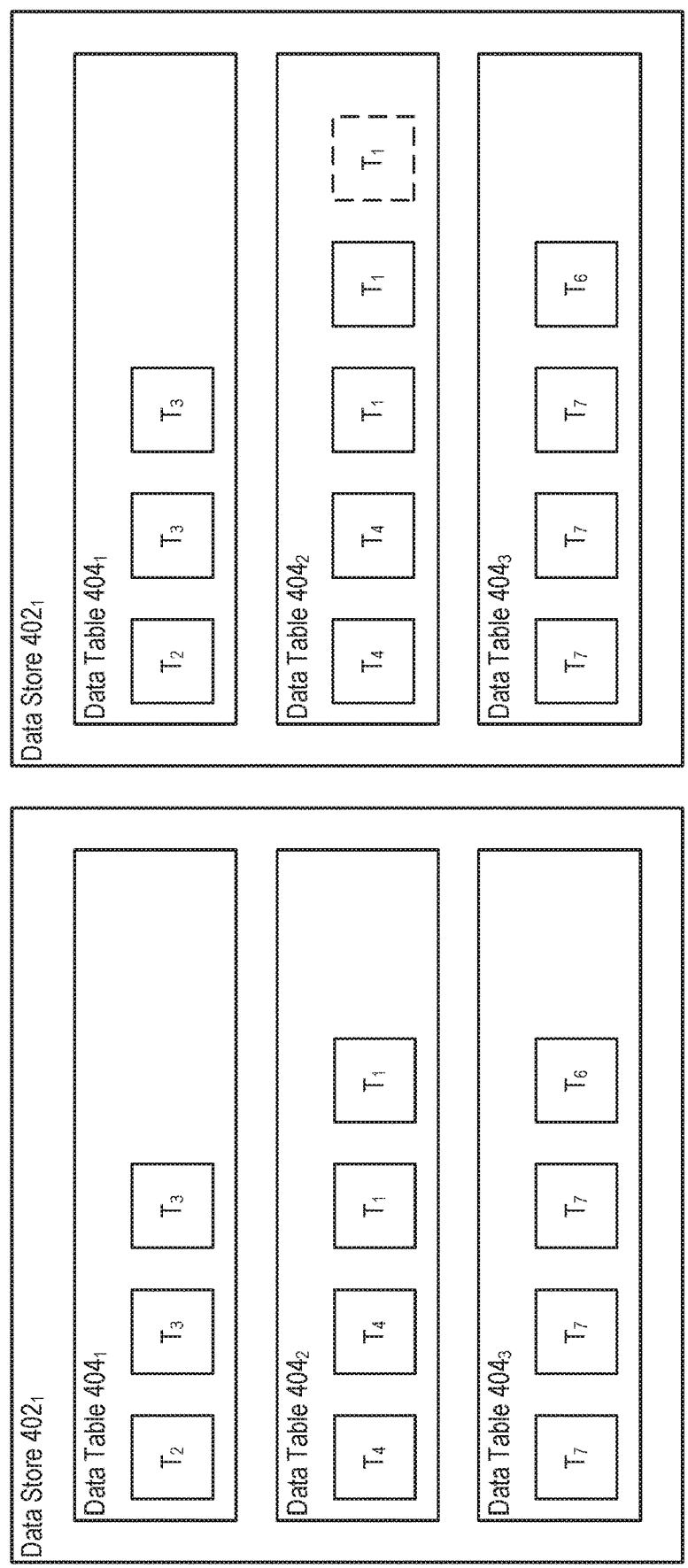
FIGS. 4A and 4B illustrate example data stores, according to one embodiment.

At step 304, management entity determines if the first transaction exists in a given data table in the data store of the user. For example, transaction searcher 108 scans each data table in user's data store to determine whether data store router 110 had previously committed the first transaction to a data table. Referring to FIG. 4A, FIG. 4A illustrates an example data store $402_1$ of the user. Data store $402_1$ includes data tables $404_1$, $404_2$, and $404_3$, with each data table $404_1$-$404_3$ directed to a pre-defined category of transactions. Data table $404_1$ includes a transaction from a second entity ($T_2$) and two transactions from a third entity ($T_3$). Data table $404_2$ includes two transactions from a fourth entity ($T_4$) and two transactions from a first entity ($T_1$). Data table $404_3$ includes three transactions from a seventh entity ($T_7$) and a transaction from a sixth entity ($T_6$). During the determination, transaction searcher 108 scans each data table $404_1$-$404_3$ to determine whether data store router 110 or user previously committed transaction from the first entity to any of the data tables $404_1$-$404_3$. If there exists a data table to which the data store router 110 or user has committed a transaction from the first entity, the data store router 110 commits the incoming transaction to that same data table. In this example, transaction searcher 108 determines that data store router 110 has committed previous transactions from the first entity ($T_1$) to data table $404_2$. Accordingly, data store router 110 writes the incoming transaction from the first entity to data table $404_2$ (step 305). Illustratively, FIG. 4B illustrates the incoming transaction from the first entity written to account $404_2$ in data store $402_1$.

In some embodiments, the transaction searcher 108 may determine that a transaction from the first entity ($T_1$) was previously committed to more than one data table. For example, assume that a transaction from $T_1$ was previously committed to both Data Table $404_2$ and committed to Data Table $404_3$. In such a scenario, multiple strategies may be implemented to commit the incoming transaction to a respective data table. In one embodiment, the transaction searcher 108 may determine which data table is the most popular data table for the entity identified in a transaction.

For example, transaction searcher 108 may commit the incoming transaction to the data store that has the most previously committed transactions from $T_1$. In another embodiment, the transaction searcher 108 may determine which data table was used most recently for a transaction from the first entity ($T_1$). For example, if the transaction searcher 108 identifies that a transaction from the first entity ($T_1$) was more recently committed to Data Table $404_3$ than Data Table $404_2$, then data store router 110 writes the incoming transaction to Data Table $404_3$. In yet another embodiment, the transaction searcher may use a combination of recency and popularity in determining which data table to commit the incoming transaction. For example, transaction searcher may use one or more weights in combination with both recency and popularity in generating a data table score to determine the data store for the incoming transaction.

Figure 5A:
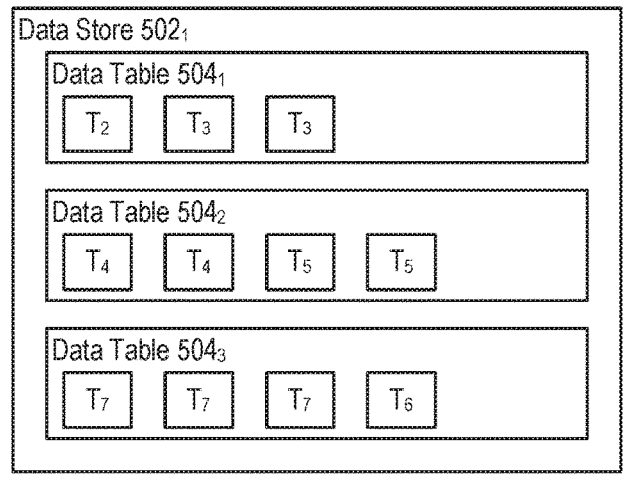
FIGS. 5A, 5B and 5C illustrate example data stores, according to one embodiment.
Figure 5B:
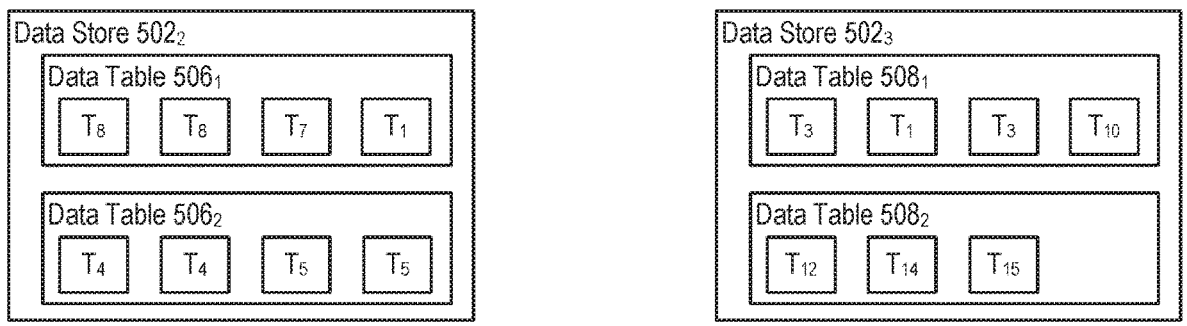
Figure 5C:
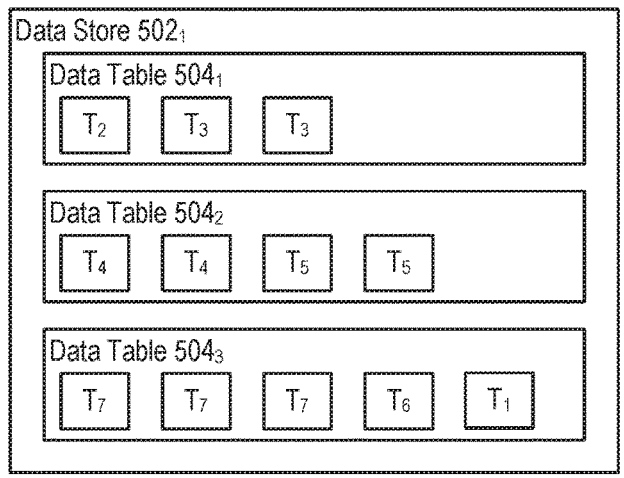

If, however, there does not exist a previous transaction from the first entity (T1), then at step 306, transaction searcher 108 scans each additional data store to determine whether a transaction from the first entity (T1) has been written thereto. For example, FIGS. 5A-5C illustrates a scenario in which a data store $502_1$ does not include any transactions from the first entity (T1) written thereto. In this example, data store $502_1$ includes data tables $504_1$, $504_2$, and $504_3$. Data table $504_1$ includes a transaction from a second entity ($T_2$) and two transactions from a third entity ($T_3$). Data table $504_2$ includes two transactions from a fourth entity ($T_4$) and two transactions from a fifth entity ($T_5$). Data table $504_3$ includes three transactions from a seventh entity ($T_7$) and a transaction from a sixth entity ($T_6$).

As illustrated, a transaction from the first entity ($T_1$) is not committed to any data table $504_1$-$504_3$ in data store $502_1$. Therefore, transaction searcher 108 will scan the data tables of each data store on the host. For example, the host may also include data stores $502_2$ and $502_3$. Generally, as discussed in FIG. 1, host may include up to n data stores. For simplicity purposes, the following example will assume that host includes only three data stores.

Data store $502_2$ includes data table $506_1$ and data table $506_2$. Data table $506_1$ includes two transactions from an eighth entity ($T_8$), a transaction from a seventh entity ($T_7$), and a transaction from the first entity ($T_1$). Data table $506_2$ includes two transactions from the fourth entity ($T_4$) and includes two transactions from the fifth entity ($T_5$). Data store $502_3$ includes data table $508_1$ and data table $508_2$. Data table $508_1$ includes two transactions from the third entity ($T_3$), a transaction from the first entity ($T_1$) and a transaction from a tenth entity ($T_{10}$). Data table $508_2$ includes a transaction from a twelfth entity ($T_{12}$), a transaction from a fourteenth entity ($T_{14}$), and a transaction from a fifteenth entity ($T_{15}$).

At step 308, transaction searcher 108 identifies those transactions that are co-located with a transaction entry from $T_1$. As used herein, a co-located transaction refers to a transaction from an $i^{th}$ entity ($T_i$) that is written to the same account in a single data store as a transaction from an $n^{th}$ entity ($T_n$). Thus, in step 312, transaction searcher 108 first identifies those data tables in data stores $502_2$ and $502_3$ to which a transaction from $T_1$ is committed, and then identifies the other entities in those accounts. Continuing with the above example, transaction searcher 108 scans data stores $502_2$ and $502_3$ and determines that a transaction from $T_1$ has been committed to data table $504_1$ and data table $506_1$. Accordingly, transaction searcher 108 identifies those entities co-located with $T_1$ in data table $504_1$ as the two transactions from the eighth entity ($T_8$) and the transaction from the seventh entity ($T_7$), and transaction searcher 108 identifies those entities co-located with the transaction from the first entity ($T_1$) in data table $506_1$ as the two transactions from the third entity ($T_3$) and the one transaction from the tenth entity ($T_{10}$).

For each co-located transaction (e.g., $T_8$, $T_7$, $T_3$, and $T_{10}$) the management application 104 generates a co-location score (step 310). A co-location score is a measure that reflects how likely it is that two merchants (financial transaction counterparts) are categorized into the same category. For example, management application 104 may cross-reference each co-located transaction against the data tables $504_1$-$504_3$ in data store $502_1$ to determine how each merchant corresponding to each co-located transaction was categorized in data store $502_1$. For example, mathematically, ranking the data tables may be represented as:

$$\text{argmax}_k \left( \sum_i (pr(A_k \mid M_i) * pr(M_i \mid M_j)) \right)$$

where $A_k$ is the $k^{th}$ data table, $M_i$ is the $i^{th}$ merchant that has been previously assigned to the $k^{th}$ data table, $M_j$ is the $j^{th}$ merchant of the transaction to be categorized, $\Sigma_i$ is the summation over i, and $\text{argmax}_k$ selects the highest input value over k.

While the probabilities may not be computed directly, the relative values may be estimated. For example, the notion of merchant coupling may be defined as a coupling score that reflects how likely two types of transaction (i.e., financial transaction counterparts) are categorized in the same data table. Such a coupling score can be computed in a variety of ways to reflect how strongly the two merchants are associated.

For example, the coupling score may be calculated as follows:

$$C_{kj} = 1/2 \left( \frac{\text{Count}(A_i \mid M_k, M_j)}{\text{Count}(A_n \mid M_j)} + \frac{\text{Count}(A_i \mid M_k, M_j)}{\text{Count}(A_m \mid M_k)} \right)$$

Count ($A_i|M_k$, $M_j$) stands for the number of data tables where both $M_K$ and $M_j$ are present. Count($A_i|M_k$) stands for the number of data tables where $M_k$ is present. Multiplying the sum by ½ normalizes the result to the (0 . . . 1) interval.

Now, for a given merchant, the data table ranking with respect to an incoming transaction with merchant, $M_n$, may be computed as the sum of the coupling of the new transaction from merchant, $M_n$, with the transactions that have been previously assigned to this data table. In some embodiments, that ranking is normalized by the number of transactions in the data table. Such quantity can be thought of as an average coupling of the transaction existing in the data table with the new transaction. Mathematically, this may be represented as:

$$AAC_{mn} = \sum_j \frac{C_{jn} : A_m \mid M_j}{|A_m|}$$

where $AAC_{mn}$ is the average coupling of transaction $M_j$ in the $m^{th}$ data table to merchant $M_j$, and $|A_m|$ is the number of transactions in the $m^{th}$ data table. The average coupling can be computed over all data tables in the data store to estimate the most likely data table to commit the incoming transaction. for example, the data table to commit the transaction would be the data table with the largest average coupling.

For example, management application 104 may generate a co-location score for each data table $504_i$ in data store $502_1$ based on at least the equations discussed above for the average coupling of transaction $M_j$ in the $m^{th}$ data table to merchant $M_j$.

At step 312, management application 104 determines whether there exists a merchant for which the co-location score is greater than zero. If management application 104 determines that a merchant has a co-location score not equal to zero, then method 300 proceeds to step A, which is discussed in more detail below in conjunction with FIGS. 6-7C. If, however, management application 104 determines that there exists a co-location score that is greater than zero, then at step 314, management application 104 selects the maximum co-location score. Continuing with the above example, management application 104 determines that data table $504_3$ has a higher co-location score than data tables $504_1$, $504_2$. For example, based on both a combination of co-occurrence of similar merchants in data stores $502_2$ and $502_3$ with transaction $T_1$ (e.g., co-located transactions $T_8$, $T_7$, $T_3$, and $T_{10}$), as well as normalizing the co-occurrence score in each data store by the amount of transactions across those data stores, management application 104 determines that data table $504_3$ has a higher colocation score than data tables $504_1$, and $504_2$.

Management application 104 then writes the transaction to a data table in the data store (step 316). For example, as shown in FIG. 5C, application agent writes the incoming transaction from merchant $T_1$ to data table $504_3$ in data store $502_1$.

Figure 6:
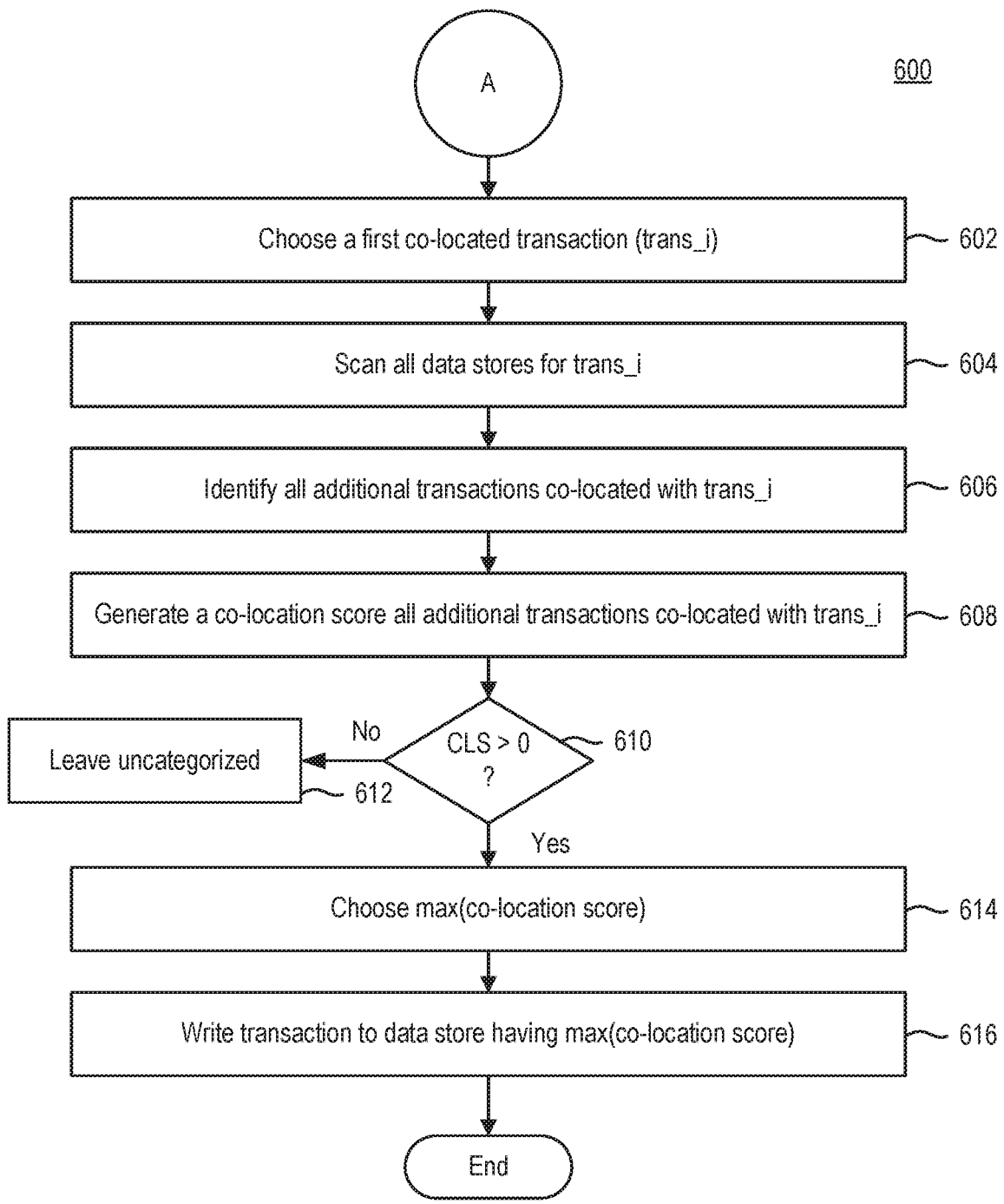
FIG. 6 is a flow diagram of a method for writing a transaction to a data store, according to one embodiment.
Figure 7A:
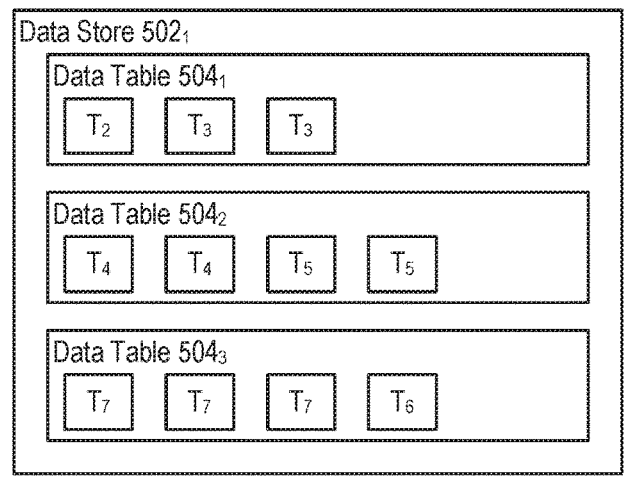
FIGS. 7A, 7B and 7C illustrate example data stores, according to one embodiment.
Figure 7B:
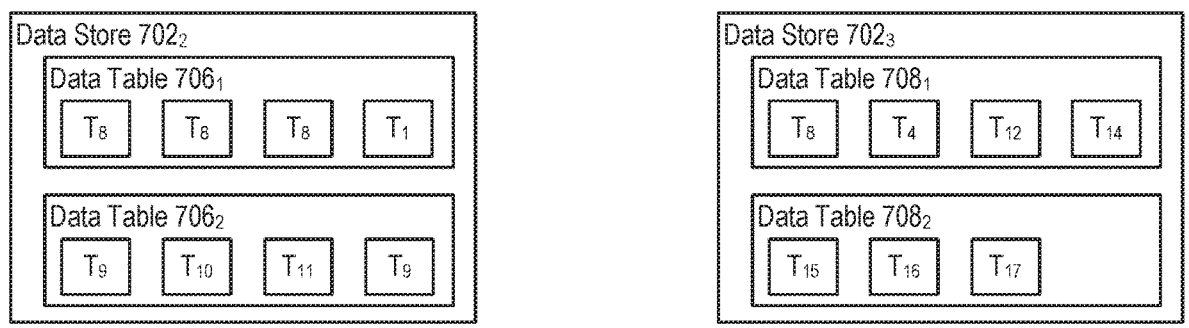

FIG. 6 illustrates a flow diagram of a method 600, according to one embodiment. Method 600 is triggered in response to management application 104 determining that the co-location score in method 300 is not greater than zero. FIG. 6 is discussed in conjunction with FIGS. 7A-7C, which illustrate data stores $502_1$, $702_2$ and $702_3$ hosted on a host. As illustrated, in addition to a transaction from the first entity ($T_1$) not being written to any data table $504_1$-$504_3$ in data store $502_1$, each of the co-located transactions (e.g., $T_8$) is also not written to data store $502_1$.

Accordingly, at step 602, transaction searcher 108 chooses a first co-located transaction. For example, in this scenario, the only co-located transaction is the transaction from the eighth merchant ($T_8$). At step 604, transaction searcher 108 scans data stores $702_2$ and $702_3$ for the co-located transaction (i.e., $T_8$). Data store $702_2$ includes data table $706_1$ and data table $706_2$. Data table $706_1$ includes three transactions from an eighth entity ($T_8$) and a transaction from the first entity ($T_1$). Data table $506_2$ includes two transactions from a ninth entity ($T_9$), a transaction from a tenth entity ("$T_{10}$"), and a transaction from an eleventh entity ($T_{11}$). Data store $702_3$ includes data tables $708_1$ and $708_-2$. Data table $708_1$ includes a transaction from the eighth entity ($T_8$), a transaction from the fourth entity ($T_4$), a transaction from the twelfth entity ($T_{12}$), and a transaction from the fourteenth entity ($T_{14}$). Data table $708_2$ includes a transaction from a fifteenth entity ($T_{15}$), a transaction from a sixteenth entity ($T_{16}$), and a transaction from a seventeenth entity ($T_{17}$).

At step 606, transaction searcher 108 identifies those transactions that are co-located with the co-located transaction from entity $T_8$. For example, transaction searcher 108 determines that a transaction from entity $T_8$ is co-located with a transaction from entity $T_4$, a transaction from entity $T_{12}$, and a transaction from entity $T_{14}$, all of which are categorized in data table $708_1$ of data store $702_3$. In other words, the transaction searcher 108 attempts to determine those similar co-located transactions with the smallest degree of separation from the incoming transaction.

At step 608, management application 104 generates a co-location score for each data table $504_i$ in data store $502_1$. For example, management application 104 may generate a co-location score for each data table $504_i$ in data store $502_1$ based on at least the equations discussed above for the average coupling of transaction $M_j$ in the $m^{th}$ data table to merchant $M_j$.

Continuing with the present example, management application 104 management application 104 determines that data table $504_2$ has a higher co-location score than data tables $504_1$, $504_3$. For example, based on both a combination of co-occurrence of similar merchants in data stores $502_2$ and $502_3$ with transaction $T_1$ (e.g., co-located transactions $T_4$, $T_{12}$, and $T_{14}$), as well as normalizing the co-occurrence score in each data store by the amount of transactions across those data stores, management application 104 determines that data table $504_2$ has a higher colocation score than data tables $504_1$, and $504_3$.

At step 610, management application 104 determines whether there exists a merchant for which the co-location score is greater than zero. If management application 104 determines that there exists a merchant for which the co-location score is equal to zero, then method 600 proceeds to step 612, in which the transaction is left uncategorized.

If, however, management application 104 determines that there exists a co-location score that is greater than zero, then at step 614, management application 104 selects the maximum co-location score. Continuing with the above example, management application 104 chooses merchant $T_4$ because merchant $T_7$ has a higher co-location score than merchant $T_{12}$ and merchant $T_{14}$. Accordingly, management application 104 determines that the incoming transaction from merchant $T_1$ should be co-located with those transactions for merchant $T_4$.

Figure 7C:
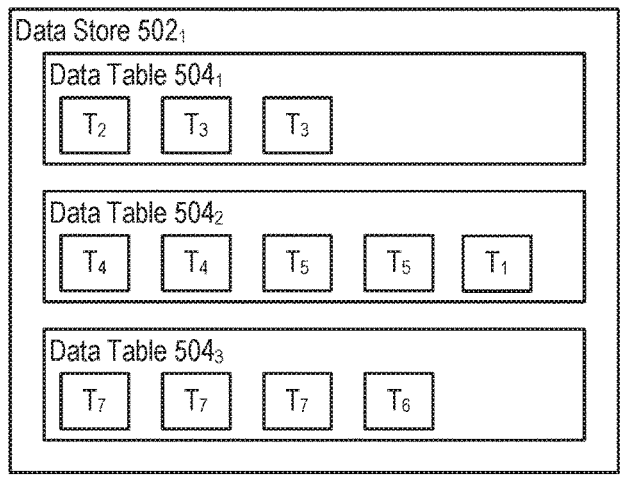

Management application 104 then writes the transaction to a data table in the data store (step 616). For example, as shown in FIG. 7C, application agent writes the incoming transaction from merchant $T_1$ to data table $504_2$ in data store $502_1$.

Generalizing the above methods 300 and 600, the concept may be extended to any number of degrees of separation between the identified merchant and the incoming transaction. For example, rather than leaving the incoming transaction uncategorized at step 612, the method 600 may revert to step 602 for management application 104 to identify $T_4$, $T_{12}$, and $T_{14}$ and subsequently scan all data stores for transactions from those merchants to determine subsequent co-located transactions. In other words, if a transaction is not immediately co-located with the incoming transaction, transaction searcher may look to transactions that are separated from the incoming transaction by a certain degree. Transaction searcher may add a weight to the co-location score that subsequently weights transactions with a larger degree of separation lower than those transactions with a smaller degree of separation. Accordingly, transaction searcher aims to identify that transaction which has a lower degree of separation from the incoming transaction, when there does not exist a transaction that is immediately co-located with the incoming transaction.

Figure 8:
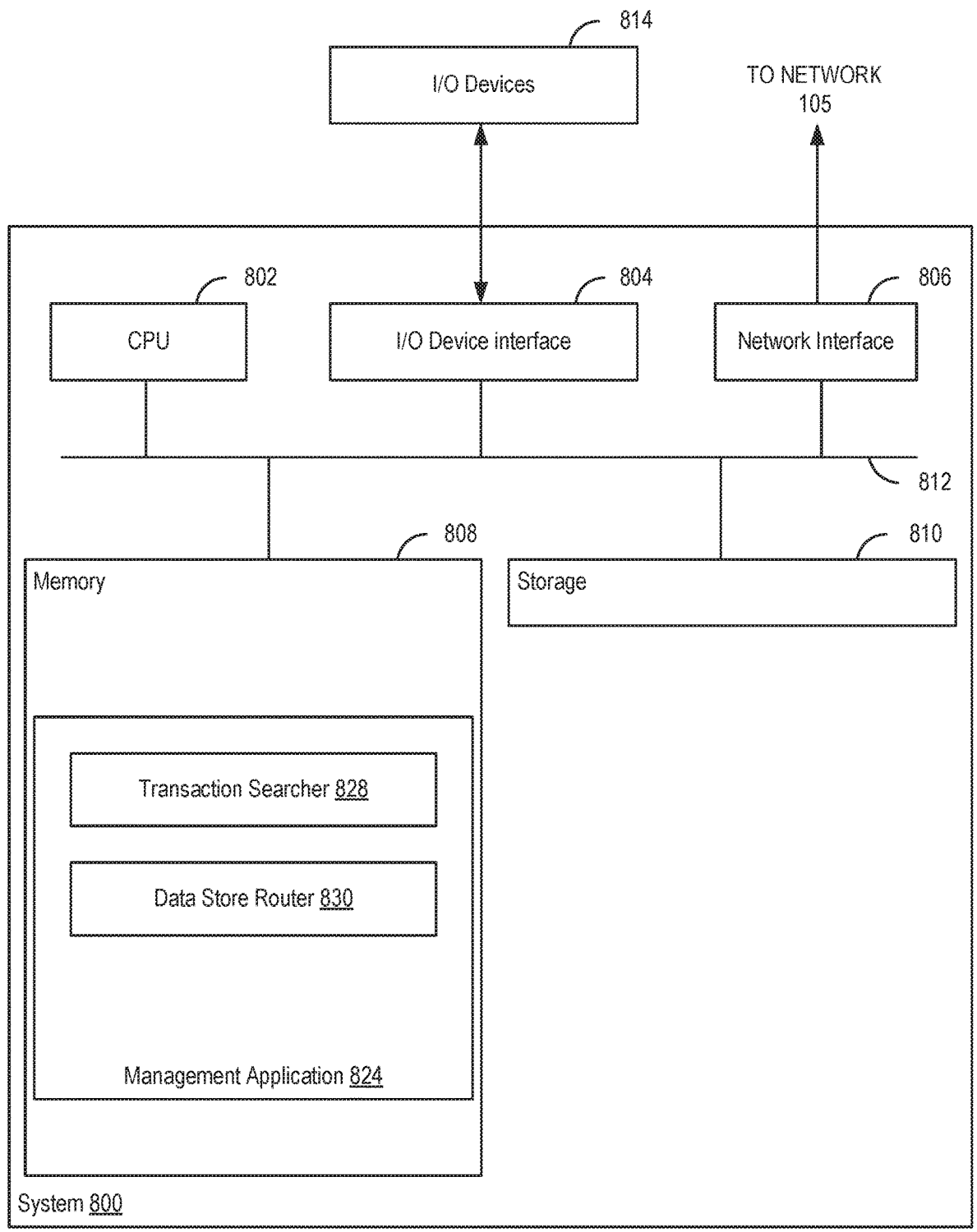
FIG. 8 illustrates a system that aids in writing a transaction to a data store, according to an embodiment.

FIG. 8 illustrates a system 800 that aids in writing a transaction to a data store, according to an embodiment. As shown, the system 800 includes, without limitation, a central processing unit (CPU) 802, one or more I/O device interfaces 804 which may allow for the connection of various I/O devices 814 (e.g., keyboards, displays, mouse devices, pen input, etc.) to the system 800, network interface 806, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 is included to be representative of a single CPU, multiple CPUs, a single CPU having multiple processing cores, and the like. Additionally, the memory 808 is included to be representative of a random access memory. Furthermore, the storage 810 may be a disk drive, solid state drive, or a collection of storage devices distributed across multiple storage systems. Although shown as a single unit, the storage 810 may be a combination of fixed and/or removable storage devices, such as fixed disc drives, removable memory cards or optical storage, network attached storage (NAS), or a storage area-network (SAN).

As shown, memory 808 includes management application 824 configured to aid in categorizing ambiguous transactions. Management application 824 includes transaction searcher 828 and data store router 830. Data store router 830 is configured to retrieve financial transactions from financial institutions. For example, in one embodiment, data store router 830 is configured to receive financial transactions transmitted from financial institution. In another embodiment, data store router 830 is configured to access one or more accounts of the user in each financial institution to import financial transaction information. Generally, financial transactions may be provided to management application 824 in real-time, as the financial institution updates their own records. For example, when the financial institution posts the transaction to their own specific online banking portal.

Transaction searcher 828 is configured to scan all the data stores 106 hosted on the host. For example, transaction searcher 828 is configured to leverage existing information related to how additional users categorize transactions from a given merchant, and apply that information to a specific user when an incoming ambiguous transaction is received.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method of writing a transaction to a data store having one or more data tables, comprising:

receiving transaction data for a first transaction of a first type;

upon determining that a transaction of the first type has been committed to the data store, committing the first transaction to a data table in the data store;

upon determining that a transaction of the first type has not been committed to any data table in the data store:

scanning a plurality of additional data stores for previously committed transactions of the first type;

for each previously committed transaction of the first type that was identified, determining additional transactions of another type that are co-located in one or more data tables of the additional data stores with the previously committed transactions of the first type;

determining a plurality of scores comprising a respective score for each respective data table of the one or more data tables representing couplings of the first transaction with respective transactions in the respective data table;

ranking the plurality of scores;

identifying a particular data table of the one or more data tables that has a highest ranking score; and writing the first transaction to the particular data table;
determining that an association does not exist between the first type and other types of transactions in the additional data stores;
determining that an association between other transactions in the data store and transactions in a particular data store of the given data stores exists;
identifying a data table in the data store based on the association between the other transactions in the data store and the transactions in the particular data store; and
writing the first transaction to the identified data table in the data store, based on a smallest degree of separation from the first transaction.

2. The method of claim 1, wherein, for each previously committed transaction of the first type that was identified, the method further comprises ranking the previously committed transactions of the first type, the ranking of the previously committed transactions of the first type comprising cross-referencing each additional transaction of the other type against the data store to determine whether there exists a similar transaction of the other type in the data store.

3. The method of claim 2, further comprising:
ranking each additional transaction of the other type; and
responsive to the ranking of each additional transaction of the other type, writing the first transaction to a data table in the data store corresponding to a data table in which an additional transaction with a highest ranking was committed.

4. The method of claim 3, wherein ranking the additional transactions of the other type, comprises:
ranking the additional transactions based on a frequency with which the additional transactions appear in the date store.

5. The method of claim 1, further comprising:
receiving a second transaction of the first type;
scanning the data store to determine whether a similar transaction of the first type has been committed to one or more data tables in the data store;
determining that the similar transaction of the first type exists in the data store; and
writing the second transaction of the first type to the data store.

6. The method of claim 5, wherein, responsive to determining that the first transaction of the first type exists in the data store, writing the second transaction of the first type to the data store comprises:
determining a data table in the data store to which the first transaction of the first type is committed; and
writing the second transaction of the first type to the data store.

7. A system, comprising:
a processor; and
memory having instructions stored thereon, which, when executed by the processor, performs an operation for writing a transaction to a data store having one or more data tables, the operation, comprising:
receiving transaction data for a first transaction of a first type;
upon determining that a transaction of the first type has been committed to the data store, committing the first transaction to a data table in the data store;
upon determining that a transaction of the first type has not been committed to any data table in the data store:
scanning a plurality of additional data stores for previously committed transactions of the first type;
for each previously committed transaction of the first type that was identified, determining additional transactions of another type that are co-located in one or more data tables of the additional data stores with the previously committed transactions of the first type;
determining a plurality of scores comprising a respective score for each respective data table of the one or more data tables representing couplings of the first transaction with respective transactions in the respective data table;
ranking the plurality of scores;
identifying a particular data table of the one or more data tables that has a highest ranking score; and
writing the first transaction to the particular data table;
determining that an association does not exist between the first type and other types of transactions in the additional data stores;
determining that an association between other transactions in the data store and transactions in a particular data store of the additional data stores exists;
identifying a data table in the data store based on the association between the other transactions in the data store and the transactions in the particular data store; and
writing the first transaction to the identified data table in the data store, based on a smallest degree of separation from the first transaction.

8. The system of claim 7, wherein, for each previously committed transaction of the first type that was identified, the operation further comprises ranking the previously committed transactions of the first type, the ranking of the previously committed transactions of the first type comprising cross-referencing each additional transaction of the other type against the data store to determine whether there exists a similar transaction of the other type in the data store.

9. The system of claim 8, wherein the operation further comprises:
ranking each additional transaction of the other type; and
responsive to the ranking of each additional transactions of the other type, writing the first transaction to a data table in the data store corresponding to a data table in which an additional transaction with a highest ranking was committed.

10. The system of claim 9, wherein ranking the additional transactions of the other type, comprises:
ranking the additional transactions based on a frequency in which additional transactions appear most frequently in the date store.

11. The system of claim 7, further comprising:
receiving a second transaction of the first type;
scanning the data store to determine whether a similar transaction of the first type has been committed to one or more data tables in the data store;
determining that the first transaction of the first type exists in the data store; and
writing the second transaction of the first type to the data store.

12. The system of claim 11, wherein responsive to determining that the first transaction of the first type exists in the data store, writing the second transaction of the first type to the data store, comprises:

determining a data table in the data store to which the first transaction of the first type is committed; and writing the second transaction of the first type to the data store.

13. A non-transitory computer readable medium having instructions stored thereon, which, when executed by a processor, performs an operation for writing a transaction to a data store having one or more data tables, comprising:

receiving transaction data for a first transaction of a first type;

upon determining that a transaction of the first type has been committed to the data store, committing the first transaction to a data table in the data store;

upon determining that a transaction of the first type has not been committed to any data table in the data store:

scanning a plurality of additional data stores for previously committed transactions of the first type;

for each previously committed transaction of the first type that was identified, determining additional transactions of another type that are co-located in one or more data tables of the additional data stores with the previously committed transactions of the first type;

determining a plurality of scores comprising a respective score for each respective data table of the one or more data tables representing couplings of the first transaction with respective transactions in the respective data table;

ranking the plurality of scores;

identifying a particular data table of the one or more data tables that has a highest ranking score; and writing the first transaction to the particular data table;

determining that an association does not exist between the first type of transaction and other types of transactions in the additional data stores;

determining that an association between other transactions in the data store and transactions in a particular data store of the additional data stores exists;

identifying a data table in the data store based on the association between the other transactions in the data store and the transactions in the particular data store; and writing the first transaction to the identified data table in the data store, based on a smallest degree of separation from the first transaction.

14. The non-transitory computer readable medium of claim 13, wherein, for each previously committed transaction of the first type that was identified, the operation further comprises ranking the previously committed transactions of the first type, the ranking of the previously committed transactions of the first type comprising cross-referencing each additional transaction of the other type against the data store to determine whether there exists a similar transaction of the other type in the data store.

15. The non-transitory computer readable medium of claim 14, wherein the operation further comprises:

ranking each additional transaction of the other type; and responsive to the ranking of each additional transaction of the other type, writing the first transaction to a data table in the data store corresponding to a data table in which an additional transaction with a highest ranking was committed.

16. The non-transitory computer readable medium of claim 15, wherein ranking the additional transactions of the other type, comprises:

ranking the additional transactions based on a frequency in which additional transactions appear most frequently in the date store.

17. The non-transitory computer readable medium of claim 13, further comprising:

receiving a second transaction of the first type;

scanning the data store to determine whether a similar transaction of the first type has been committed to one or more data tables in the data store;

determining that the first transaction of the first type exists in the data store; and writing the second transaction of the first type to the data store.

* * * * *